US008242895B2

(12) United States Patent
Shen et al.

(10) Patent No.: US 8,242,895 B2
(45) Date of Patent: *Aug. 14, 2012

(54) METHOD AND SYSTEM FOR FORMING SURROUNDING SEAMLESS BIRD-VIEW IMAGE

(75) Inventors: Hsin-Liang Shen, Yunlln County (TW); Kuo-Hsiang Cheng, Taipei County (TW); Tung-Chuan Wu, Hsinchu (TW); Din-Chang Tseng, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 367 days.

This patent is subject to a terminal disclaimer.

(21) Appl. No.: 12/701,833

(22) Filed: Feb. 8, 2010

(65) Prior Publication Data

US 2011/0156887 A1 Jun. 30, 2011

(30) Foreign Application Priority Data

Dec. 30, 2009 (TW) ............................... 98145942 A

(51) Int. Cl.
*B60Q 1/00* (2006.01)
*G06K 9/36* (2006.01)
*G06F 19/00* (2011.01)
*H04N 5/225* (2006.01)

(52) U.S. Cl. ..................... 340/425.5; 382/284; 382/294; 382/232; 340/937; 340/436; 701/116; 348/218.1; 348/222.1

(58) Field of Classification Search .......................... None
See application file for complete search history.

(56) References Cited

U.S. PATENT DOCUMENTS

| 5,949,331 | A  | * | 9/1999  | Schofield et al. ............. 340/461 |
| 6,507,665 | B1 |   | 1/2003  | Cahill et al.                          |
| 7,161,616 | B1 |   | 1/2007  | Okamoto et al.                         |
| 7,499,079 | B2 | * | 3/2009  | Evans et al. ................. 348/218.1 |
| 8,041,147 | B2 | * | 10/2011 | Molnar et al. ................ 382/284  |
| 2002/0163582 | A1 | * | 11/2002 | Gruber et al. ............. 348/218.1 |
| 2006/0202984 | A1 |   | 9/2006  | Yang et al.                          |
| 2007/0003108 | A1 |   | 1/2007  | Chinomi et al.                       |
| 2009/0097708 | A1 |   | 4/2009  | Mizuta                               |
| 2010/0172546 | A1 | * | 7/2010  | Sharp ........................... 382/106 |

FOREIGN PATENT DOCUMENTS

| CN | 101487895 A   | 7/2009 |
| JP | 2006121587 A  | 5/2006 |
| JP | 2008-048317 A | 2/2008 |

* cited by examiner

*Primary Examiner* — Jennifer Mehmood
*Assistant Examiner* — Fekadeselassie Girma
(74) *Attorney, Agent, or Firm* — Rabin & Berdo, P.C.

(57) ABSTRACT

A method and system for forming a surrounding seamless bird-view image by processing a plurality of surrounding images associated with a carrier captured by different imaging devices is provided in the present invention. During the process, the surrounding images are converted into corresponding bird-images respectively and then an overlapping area corresponding to each two adjacent bird-view images is determined. After that, distances between the pixel in the overlapping area and the boundary of the overlapping area in each adjacent bird-view image is calculated so as to determine a weighting value for each corresponding pixel in each adjacent bird-view image thereby forming an overlapping image, wherein each pixel in the overlapping image is determined according to the weighting value and information of the corresponding pixel in each adjacent image. After determining the overlapping image for each two adjacent bird-view image, it is capable of forming the surrounding seamless bird-view image.

21 Claims, 11 Drawing Sheets

METHOD AND SYSTEM FOR FORMING SURROUNDING SEAMLESS BIRD-VIEW IMAGE

TECHNICAL FIELD

The present disclosure relates to an image processing technique, and more particularly, to a method and system for forming surrounding seamless bird-view image.

TECHNICAL BACKGROUND

Image-based vehicle maneuvering assistant methods and systems had been available and used for many years. However, most such conventional image-based vehicle maneuvering assistant methods and systems are only designed to display images surrounding their corresponding vehicles to drivers directly and exactly as they are being captured in their imaging devices. Thus, in despite of they actually are helpful with respect to driving assistance, they can sometimes create a kind of visual burden to drivers with the increasing of imaging devices since there can be a plurality of images from the imaging devices crowding in one monitoring screen. For overcoming such problem, it is in need of a technique for constructing a surrounding bird-view image by the use of a plurality of surrounding images captured respectively from different imaging devices. Such technique for constructing a full image in the bird's eye view surrounding a vehicle is becoming the mainstream in the automobile manufacturing industry when it come to the developing of a more advance and safer vehicle. Operationally, the surrounding images from common imaging devices installed on various locations of a vehicle are processed and converted into corresponding bird-view images which are then being combined into a full image in the bird's eye view surrounding the vehicle to be provided to the vehicle's driver, and thereby, the driving safety of the vehicle enhanced.

However, the key issue for combining the plural surrounding images captured respectively by different imaging devices located at different positions on a vehicle is to recognize and determine if there is an overlapped region in two surrounding images captured by any two imaging devices that are adjacent to each other. One method for dealing with the aforesaid key issue is disclosed in U.S. Pat. Pub. No. 2007/0003108, which reveals a technique for combing a plurality of images taken by plural cameras focusing in different directions around a vehicle into a bird-view image showing the entire view surrounding the vehicle. However, as the bird-view image is divided into plural regions by setting mask line at each joining line between adjacent images, the bird-view image in this disclosure is not seamless combined. That is, the various surrounding images taken by the plural cameras in different directions around the vehicle are not combined seamlessly that there can be overlapped region existed in two images taken by any two adjacent cameras, and therefore, it may required to have ultrasonic radar detectors to be arranged on the vehicle at positions corresponding to the overlapped regions as alarming devices for assisting the maneuvering of the vehicle. Nevertheless, the arranging of the ultrasonic radar detectors is going to cost the manufacturing cost of the aforesaid system to increase.

Moreover, in a driving support system disclosed in U.S. Pat. Pub. No. 2006/0202984, different all-round bird-view images are generated from the images taken by four cameras mounted on a vehicle according to the case where the vehicle is stopped, the case where the vehicle is driven forward, and the case where the vehicle is driven in reverse while the depression angle of each camera for capturing images is defined by the height between the corresponding camera and the ground, by that the system is able to simulate and acquire a larger all-round bird-view image showing the entire view surrounding the vehicle. In Japanese Patent Laid-Open Publication No. 2008-048317, a method for weighting corresponding features in the overlapped region between two images taken by two adjacent cameras that are mounted on a carrier, by which the two images can be combined in a manner that the features with higher weights are preserved in the overlapped region while the corresponding feature with smaller weight in the overlapped region are deleted, and thereby, various surrounding images taken by the plural cameras in different directions around the carrier can be combined into a bird-view image showing the entire view surrounding the carrier. In U.S. Pat. Pub. No. 2009/0097708, an image-processing system for processing image data obtained by capturing a plurality of images outside a periphery of a vehicle is provided, in which a plurality of image-capturing units, being affixed to the vehicle, are used for generating bird-view images outside the periphery of the vehicle in a manner that end portions of real spaces corresponding to two adjacent bird-view images overlap each other, and accordingly the generated bird-view images are provided to an image-composition unit where they are combined into a bird-view-composite image according to a predetermined layout as each overlap portion being included are determined to be a border image that is provided to be superimposed on its corresponding bird-view image. Thus, by the composition of those bird-view images with borders, a surrounding bird-view image showing the entire view surrounding the vehicle can be achieved. In Japanese Patent Laid-Open Publication No. 2006-121587, an operation supporting device capable of suppressing deterioration in image quality due to the joint between images is provided, by which the device changes the joint position of images in image synthesis when the bird-view image is created to a position different from the previous one. Therefore, the joint does not continuously exist at a fixed position in the bird-view image, thus preventing an object from being displayed discontinuously at the joint between the images, preventing the object from continuing to disappear, and hence suppressing the deterioration of the image quality caused by the joint between the images. It is noted that the key issues in the abovementioned four patents for combining the plural surrounding images captured respectively by different imaging devices located at different positions on a vehicle are to recognize and determine if there is an overlapped region in two surrounding images captured by any two imaging devices that are adjacent to each other. Then, as each surrounding image is transformed into a corresponding bird-view image with reference to the location of its corresponding imaging devices, the plural bird-view images can be combined with reference to the identified overlapped regions so as to layout and achieve a surrounding bird-view image showing the entire view surrounding the vehicle.

In addition, in U.S. Pat. No. 7,161,616, an image processing apparatus is provided, which includes an image processing part for receiving images captured by a plurality of cameras shooting surroundings of a vehicle to generate a synthetic image from these camera images, wherein the image processing part uses mapping data describing a correspondence relationship between pixels of the synthetic image and a plurality of pixel data including one or both of pixel data of the camera images and pixel data other than the camera images, and describing the rate of necessity with respect to each of the pixel data, and weights each pixel data in accordance with the rate of necessity, thereby generating the pixel data of the pixels of the synthetic image.

TECHNICAL SUMMARY

The present disclosure provides a method and system for forming surrounding seamless bird-view image, being adapted for a variety of carriers having a plurality of cameras mounted thereon with different field-of-views, by which a surrounding seamless bird-view image showing the entire view surrounding the carrier can be achieved by the use of a calibration process and a bird-view conversion algorithm with the assistance of information relating to known ground features. Thereby, during the movement of the carrier, the corresponding relationship between the moving direction of the carrier and ambient environment can be identified and recognized by the carrier's driver from the seamless bird-view image without being misled or confused by the joints between any two adjacent images for forming the seamless bird-view image.

In an exemplary embodiment, the present disclosure provides a method for forming surrounding seamless bird-view image, comprising the steps of: providing a plurality of surrounding images; performing a viewpoint transformation process upon the plural surroundings for transforming the same into a plurality of corresponding bird-view images; identifying an overlapped region from any two adjacent bird-view images; performing a weight calculation process for multiple times so as to obtain an overlapped image from the overlapped regions of any two adjacent bird-view images; and combining the plural overlapped images and the portions of the plural transformed bird-view images that are not overlapped into a surrounding seamless bird-view image. Moreover, each weight calculation process further comprises the steps of: measuring a distance between each pixel in the overlapped region and the boundary of the overlapped region in one of the corresponding two adjacent bird-view image and another distance between the same pixel and the boundary of the overlapped region in another corresponding two adjacent bird-view image; determining a first weighting value for each pixel in the overlapped region of one of the corresponding two adjacent bird-view image while determining a second weighting value for the corresponding pixel of another adjacent bird-view image according to the measured distances of the pixel; and performing a weighted feature calculation on an image feature of the corresponding pixels in the overlapped regions of the two adjacent bird-view images by the use of the first weighting value and the second weighting value so as to obtain an overlapped feature for the corresponding pixels.

In another exemplary embodiment, the present disclosure provides a method for forming surrounding seamless bird-view image, comprising:
a plurality of imaging units, respectively mounted on a carrier at different positions thereof, each being used for generating a surrounding image;
a control unit, for receiving the plural surrounding images and then performing an operation comprising the steps of:
performing a viewpoint conversion process upon the plural surroundings for transforming the same into a plurality of corresponding bird-view images;
identifying an overlapped region from any two adjacent bird-view images;
performing a weight calculation process so as to obtain an overlapped image from the overlapped regions of any two adjacent bird-view images as the weight calculation process further comprises the steps of:
measuring a distance between each pixel in the overlapped region and the boundary of the overlapped region in one of the corresponding two adjacent bird-view image and another distance between the same pixel and the boundary of the overlapped region in another corresponding two adjacent bird-view image;
determining a first weighting value for each pixel in the overlapped region of one of the corresponding two adjacent bird-view image while determining a second weighting value for the corresponding pixel of another adjacent bird-view image according to the measured distances of the pixel; and
performing a weighted feature calculation on an image feature of the corresponding pixels in the overlapped regions of the two adjacent bird-view images by the use of the first weighting value and the second weighting value so as to obtain an overlapped feature for the corresponding pixels; and
combining the plural overlapped images and the portions of the plural transformed bird-view images that are not overlapped into a surrounding seamless bird-view image;
and
a display unit, disposed inside the carrier while coupling to the control unit, for receiving and displaying the surrounding seamless bird-view image.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
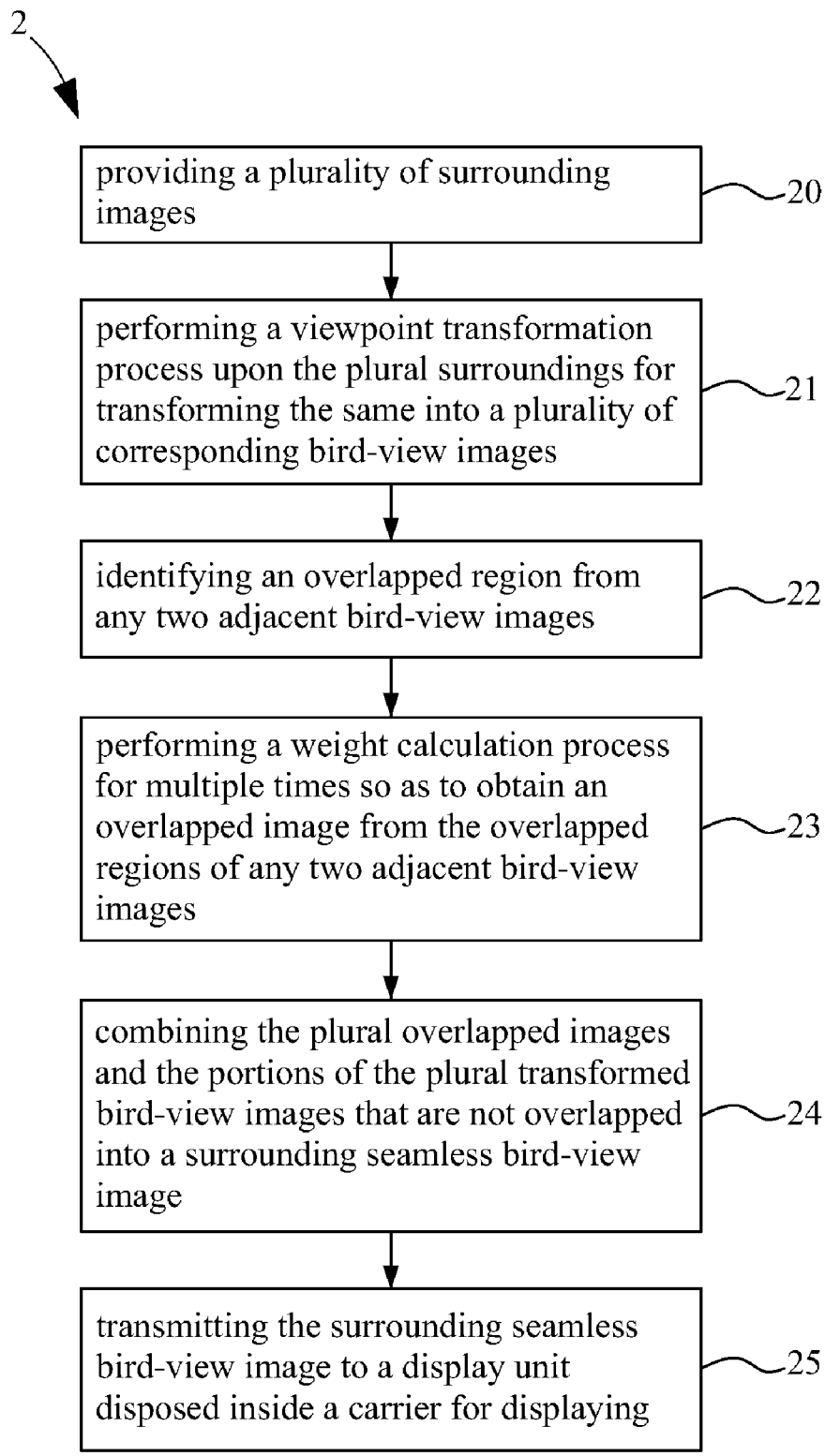
FIG. 1 is a flow chart depicting the steps of a method for forming surrounding seamless bird-view image according to an embodiment of the present disclosure.

Please refer to FIG. 1, which is a flow chart depicting the steps of a method for forming surrounding seamless bird-view image according to an embodiment of the present disclosure. The flow shown in FIG. 1 starts from step 20. At step 20, there are a plurality of surrounding images being provided; and then the flow proceeds to step 21. It is noted that each of the plural surrounding images is an image showing a portion of ambient environment surrounding a carrier, whereas the carrier can be a vehicle. Moreover, the plural surrounding images can be generated by the use of a plurality of imaging devices as the plural imaging devices are mounted on a carrier at different positions thereof while focusing in different directions around the carrier. In addition, each imaging device can be a CCD or a CMOS. Please refer to FIG. 2A, which is a schematic diagram showing how a plurality of surrounding images is to be captured by the use of different imaging devices mounted on a carrier respectively at different positions thereof in the present disclosure. In the embodiment shown in FIG. 2A, there are four imaging devices 900~903 being respectively mounted on the front side, the rear side, the left side and the right side of the carrier 90 for capturing surrounding images 91~94.

Figure 2A:
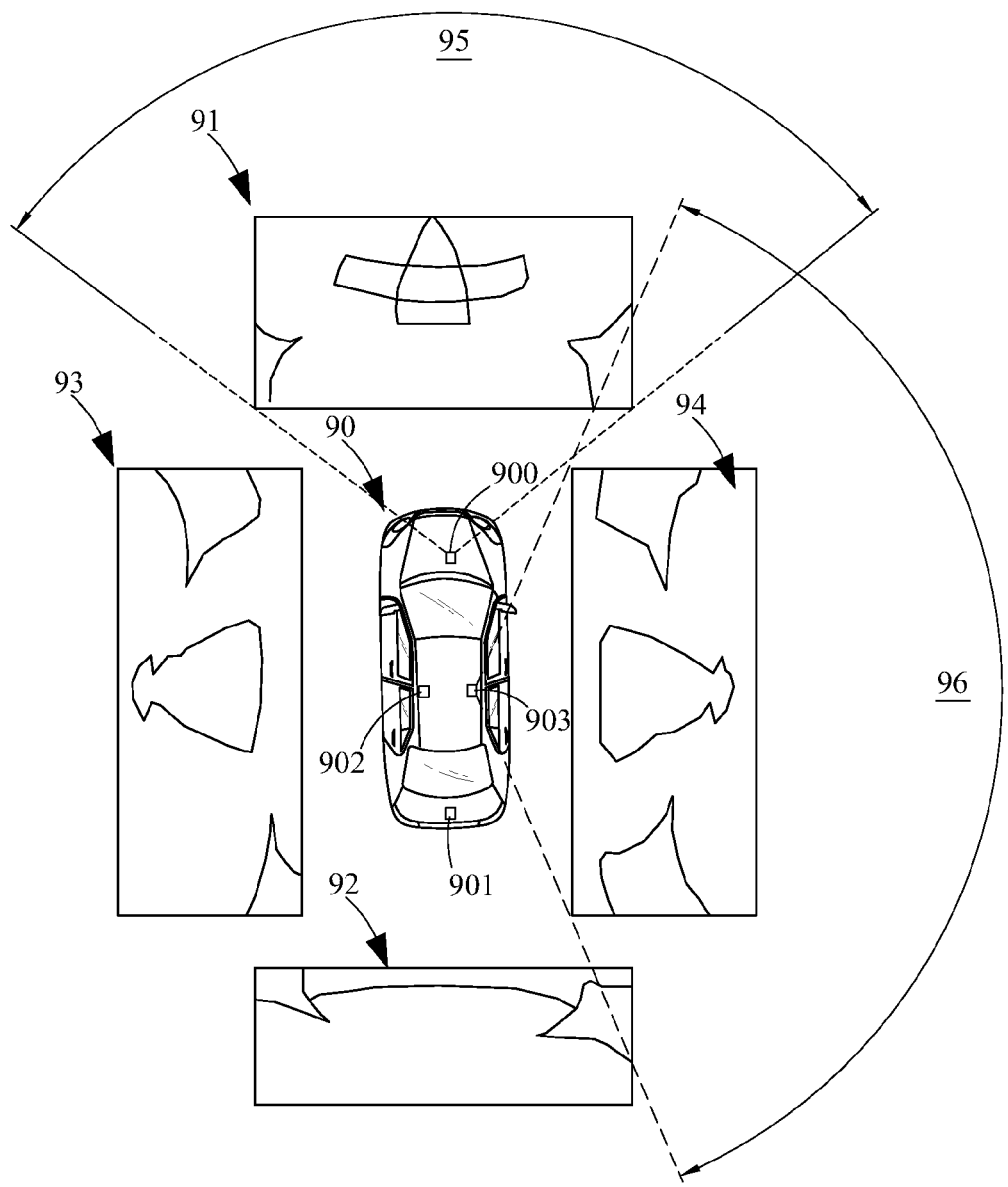
FIG. 2A is a schematic diagram showing how a plurality of surrounding images is to be captured by the use of different imaging devices mounted on a carrier respectively at different positions thereof in the present disclosure.
Figure 2B:
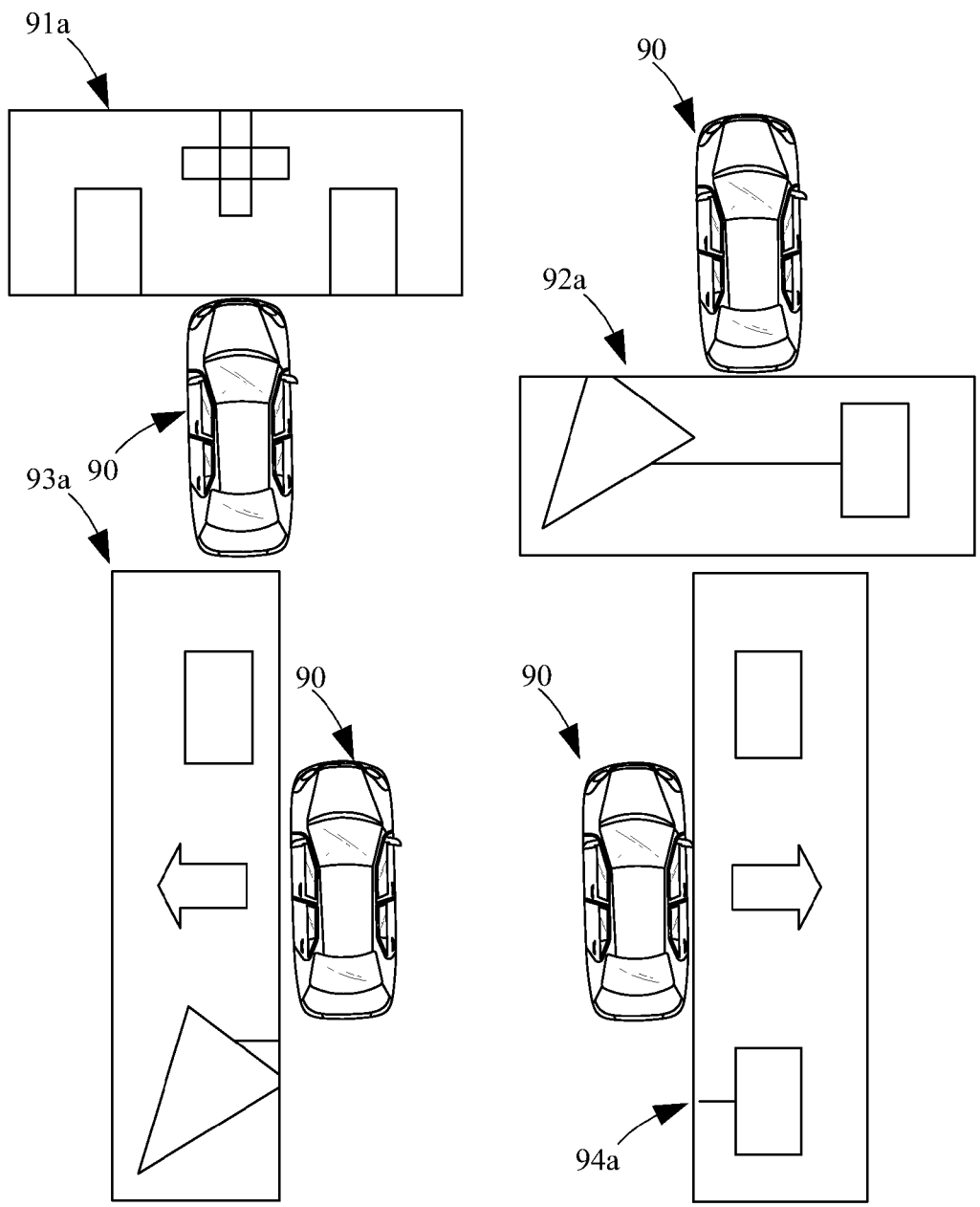
FIG. 2B is a schematic diagram showing how the plural surrounding images are to be converted into corresponding bird-view images in the present disclosure.

As soon as the plural surrounding images are obtained, the flow proceeds to step 21. At step 21, a viewpoint transformation process is performed upon the plural surroundings for transforming the same into a plurality of corresponding bird-view images; and then the flow proceeds to step 22. Specifically, as soon as the plural surrounding images are obtained by the use of different imaging devices mounted on the carrier respectively at different positions thereof, the surrounding images are first being calibrated for eliminating fish eye effect or any deformation, and then are processed by the viewpoint transformation process for converting those surrounding images into corresponding bird-view images, as those shown in FIG. 2B. In FIG. 2B, the front, the rear, the left and the right bird-view images 91a~94a are converted from their corresponding surrounding images 91~94 in respectively. It is noted that the calibration technique for eliminating fish eye effect and deformation is known to those skilled in the art and thus will not be described further herein.

Figure 2C:
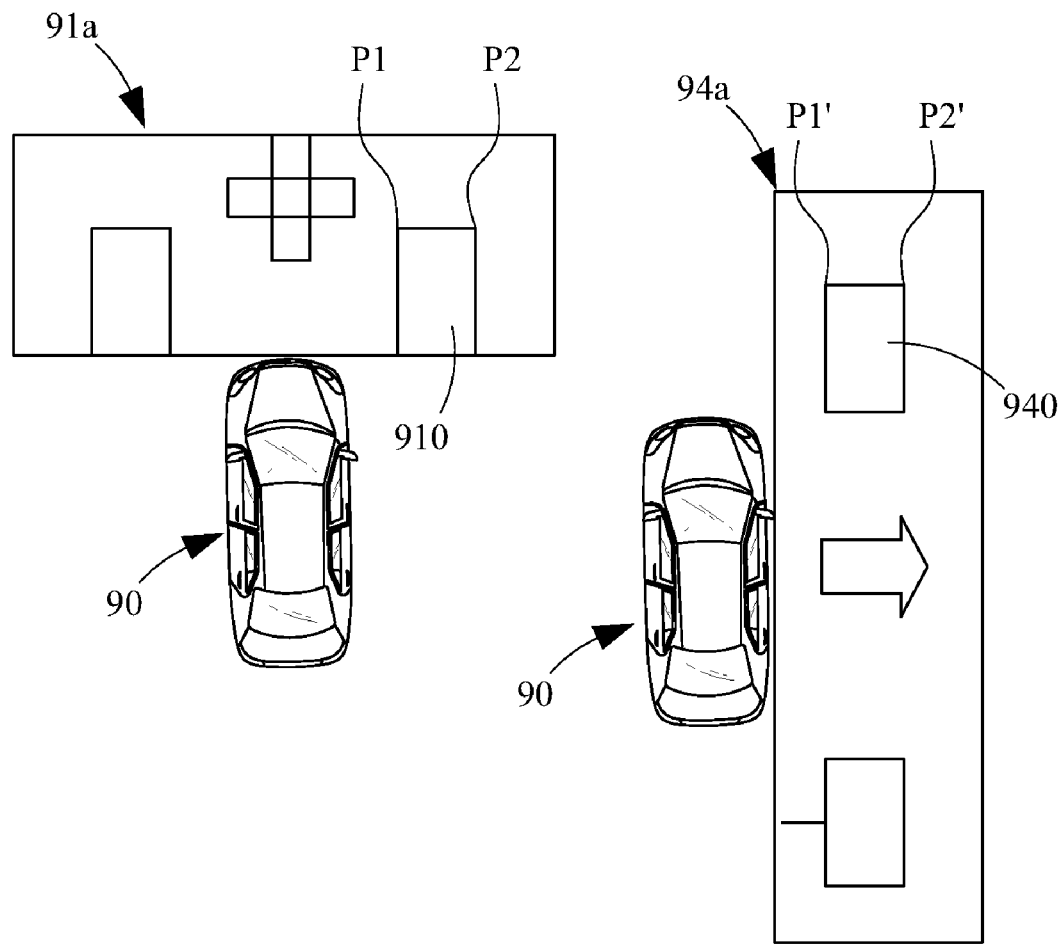
FIG. 2C is a schematic diagram showing the acquisition of one pair of corresponding points in two adjacent bird-view images of the present disclosure.

At step 22, an overlapped region is identified from any two adjacent bird-view images; and then the flow proceeds to step 23. Taking the surrounding images 91 and 94 captured by the front imaging device 900 and the right imaging device 903 for example, as the field-of-views of the two imaging devices 900 and 903 are overlapped with each other by a portion thereof, there can be objects in the ambient of the carrier 90 being captured the two imaging devices 900 and 903 simultaneously in a manner that there can be a portion of such object being existed at the same time in the two the surrounding images 91 and 94, as shown in FIG. 2A. Thus, after being processed by the viewpoint conversion process, there can be an overlapped region existed between any two adjacent bird-view images. In this embodiment shown in FIG. 2B, there is an overlapped region existed respectively in the two bird-view images 91a and 93a, as there is one between the two bird-view images 91a and 94a, as there is one between the two bird-view images 92a and 93a, and as there is one between the two bird-view images 92a and 94a. Thus by the performing of the step 22, all those overlapped regions can be identified and defined. Please refer to FIG. 3, which is a flow chart depicting the steps for identifying overlapped regions in the present disclosure. The flow of FIG. 3 for identifying overlapped regions starts from step 220. At step 220, a reference plane is determined; and then the flow proceeds to step 221. It is noted that the reference plane is the ground level in this embodiment, but is not limited thereby. At step 221, a process is performed for searching the two adjacent bird-view images along the reference plane so as to acquire at least one pair of corresponding points from the two adjacent bird-view images; and then the flow proceeds to step 222. Please refer to FIG. 2C, which is a schematic diagram showing the acquisition of one pair of corresponding points in two adjacent bird-view images of the present disclosure. In FIG. 2C, there is an object having a potion thereof existed at the same time in the two adjacent bird-view images 91a and 94a, which are represented as the FIG. 910 in the bird-view images 91a and the FIG. 940 in the bird-view images 94a. According, by the process performed in step 221, two pairs of corresponding points, i.e. the pair of P1 and P2, and another pair of P1' and P2', can be located on the reference plane. It is noted that each of the corresponding points of the two adjacent bird-view images is a specific object in its corresponding bird-view image selected from the group consisting of: lines, patterns and texts.

After corresponding points are located, the flow for identifying overlapped region proceeds to step 222. At step 222, the two adjacent bird-view images are adjusted relative to each other for minimizing an error associating with the at least one pair of corresponding points. In this embodiment, the error is defined to be the mean square of the characteristic values respectively associating to the at least one pair of the corresponding points in the two adjacent bird-view images, which is defined by the following equation:

$$err = \frac{\sum_{i=1}^{n}[I_1(q_{1i}) - I_2(p_{2i})]^2}{n}, \quad (1)$$

wherein $p_{2i} = M_{rigid}(q_{1i})$ n represents the number of pairs of corresponding points located;

$q_{1i}$ is the corresponding point in the $i^{th}$ pair that is existed in the bird-view image 91a;

$p_{2i}$ is the corresponding point in the $i^{th}$ pair that is existed in the bird-view image 94a;

$M_{rigid}(x)$ is an image conversion algorithm, which include rotating, shift and scaling; and $I_j(x)$ represents the characteristic value to the corresponding point existed in the x coordinate in the $j^{th}$ bird-view image, which includes brightness value and color value in this embodiment shown in FIG. 2C.

Figure 2D:
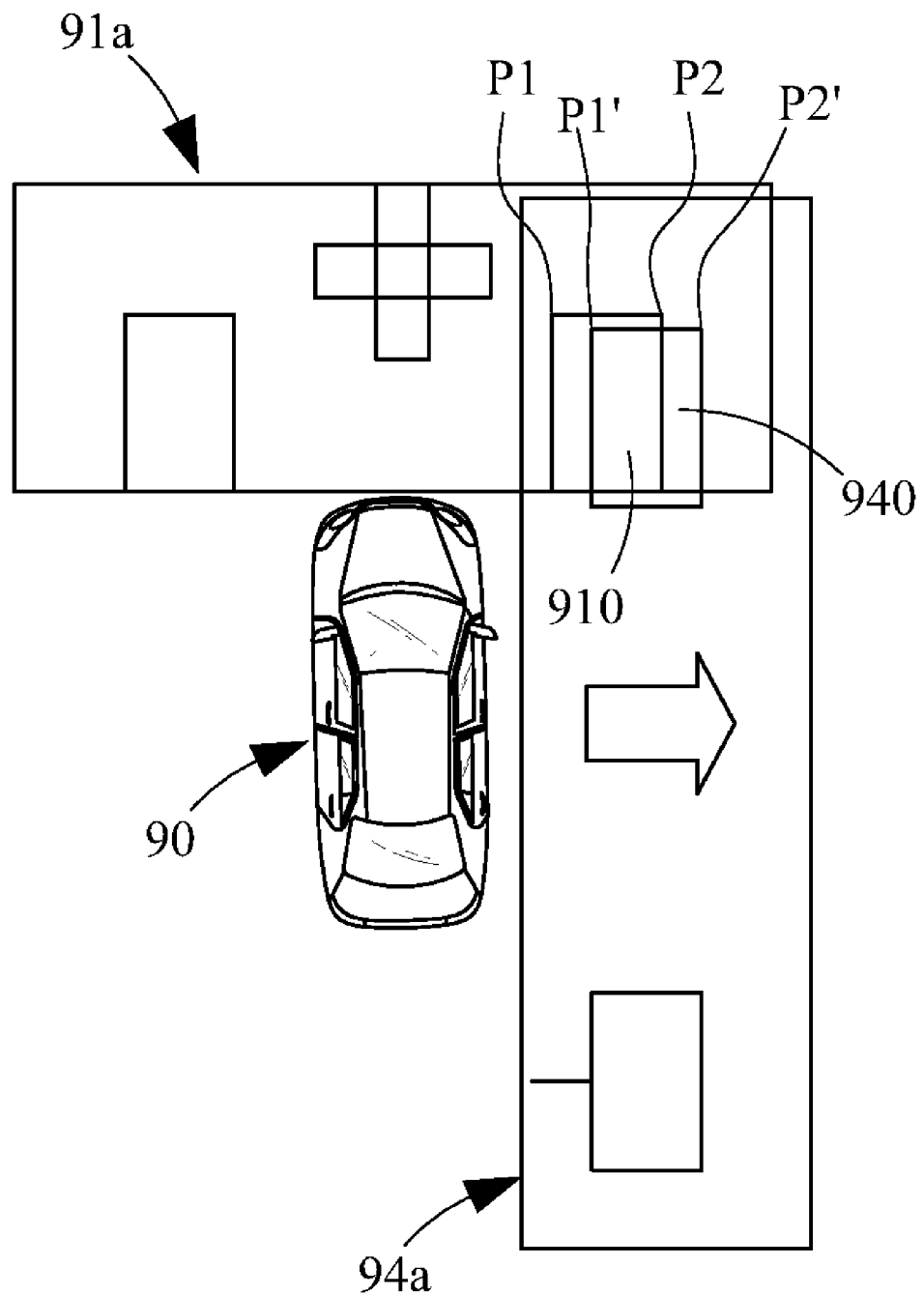
FIG. 2D is a schematic diagram showing how the two adjacent bird-view images can be shifted and adjusted for minimizing the error associating to the pair of corresponding points in the present disclosure.
Figure 2E:
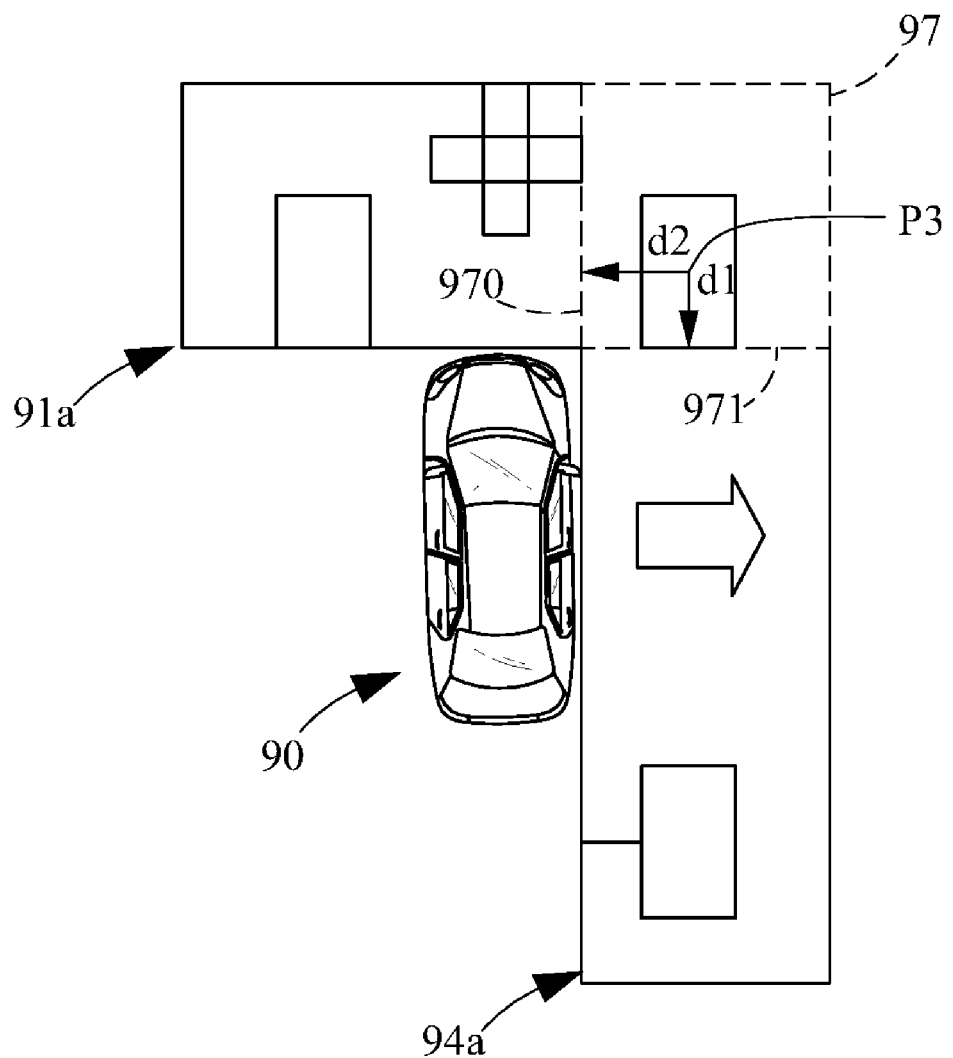
FIG. 2E is a schematic diagram showing how the two adjacent bird-view images can be combined according to the result of a weight calculation process in the present disclosure.

Please refer to FIG. 2D, which is a schematic diagram showing how the two adjacent bird-view images can be shifted and adjusted for minimizing the error associating to the pair of corresponding points in the present disclosure. As there is an error value, i.e. err, being defined and enabled to changed continuously in correspondence to each adjustment when the two adjacent bird-view images are being adjusted relative to each other, it is concluded that when the err is at its minimum, the two adjacent images 91a and 94a are positioned in a manner that the corresponding point P1 in the bird-view image 91a is positioned almost exactly on top of the corresponding point P2 in the bird-view image 94a while the corresponding point P1' in the bird-view image 91a is positioned almost exactly on top of the corresponding point P2' in the bird-view image 94a, as shown in FIG. 2E. Thus, the area defined within the dotted line shown in FIG. 2E is the overlapped image 97 of the two adjacent bird-view images 91a and 94a. Similarly, the overlapped regions between the two adjacent bird-view images 91a and 93a, the two adjacent bird-view images 92a and 93a, and the two adjacent bird-view images 92a and 94a can all be identified.

After the overlapped regions are identified, the flow of FIG. 1 proceeds to step 23. At step 23, a weight calculation process is performed for multiple times so as to obtain an overlapped image from the overlapped regions of any two adjacent bird-view images; and then the flow proceeds to step 24. In order to combined all the bird-view images of the carrier into a surrounding bird-view image showing entire view surrounding the carrier without any blind spots, the two overlapped regions respectively defined in two adjacent bird-view images should be weighted by the weight calculation process for enabling the two the bird-view images to be integrated into one overlapped image so as to preparing two adjacent bird-view images to be combined into the required surrounding bird-view image. Please refer to FIG. 4, which is a flow chart depicting the steps of a weight calculation process according to an embodiment of the present disclosure. The flow of FIG. 4 starts from the step 230. At step 230, a process is performed for measuring a distance between each pixel in the overlapped region and the boundary of the overlapped region in one of the corresponding two adjacent bird-view image and another distance between the same pixel and the boundary of the overlapped region in another corresponding two adjacent bird-view image; and then the flow proceeds to step 231. As shown in FIG. 2E, the distance d1 between the corresponding point P3 and the boundary 971 in the bird-view image 94a and distance d2 between the corresponding point P3 and the boundary 970 in the bird-view image 91a are measured.

At step 231, a first weighting value for each pixel in the overlapped region of one of the corresponding two adjacent bird-view image is determined and the same time that a second weighting value for the corresponding pixel of another adjacent bird-view image according to the measured distances of the pixel is determined; and then the flow proceeds to step 232. In an embodiment of the present disclosure, the first weighting value and the second weighting value are determined by the following equations:

$$w_1 = \frac{d_2}{d_1 + d_2} \quad (2)$$

$$w_{21} = \frac{d_1}{d_1 + d_2} \quad (3)$$

As shown in FIG. 2E, the weighting value $w_1$ determined according to the two measured distances d1 and d2 represents the contribution of the corresponding point P3 in the overlapped region from the bird-view image 91a, while the weighting value $w_2$ determined according to the two measured distances d1 and d2 represents the contribution of the corresponding point P3 in the overlapped region from another the bird-view image 94a.

After the process of step 231 is completed, the flow proceeds to step 232. At step 232, a weighted feature calculation is performed on an image feature of the corresponding pixels in the overlapped regions of the two adjacent bird-view images by the use of the first weighting value and the second weighting value so as to obtain an overlapped feature for the corresponding pixel. In this embodiment, the weighted feature calculation is performed according to the following equation:

$$I(P_3)=w_1I_1(P_3')+w_2I_2(P_3'') \quad (4)$$

According to the abovementioned equation (4), each characteristic value of each pixel $P_3$ in the resulting overlapped image is the sum of the same characteristic values of their corresponding pixels $P_3'$ and $P_3''$ in their respective bird-view images 91a and 94a after being multiplied with their respective weighting values. By performing the steps 230~232 upon all the corresponding pixels in their respective overlapped regions of the two adjacent bird-view images 91a and 94a, an overlapped image 97 can be obtained, as shown in FIG. 2E. Similarly, the same process can be applied for the other adjacent bird-view images, such as the two bird-view images 91a and 93a, the two bird-view images 92a and 93a, the two bird-view images 92a and 94a.

Figure 2F:
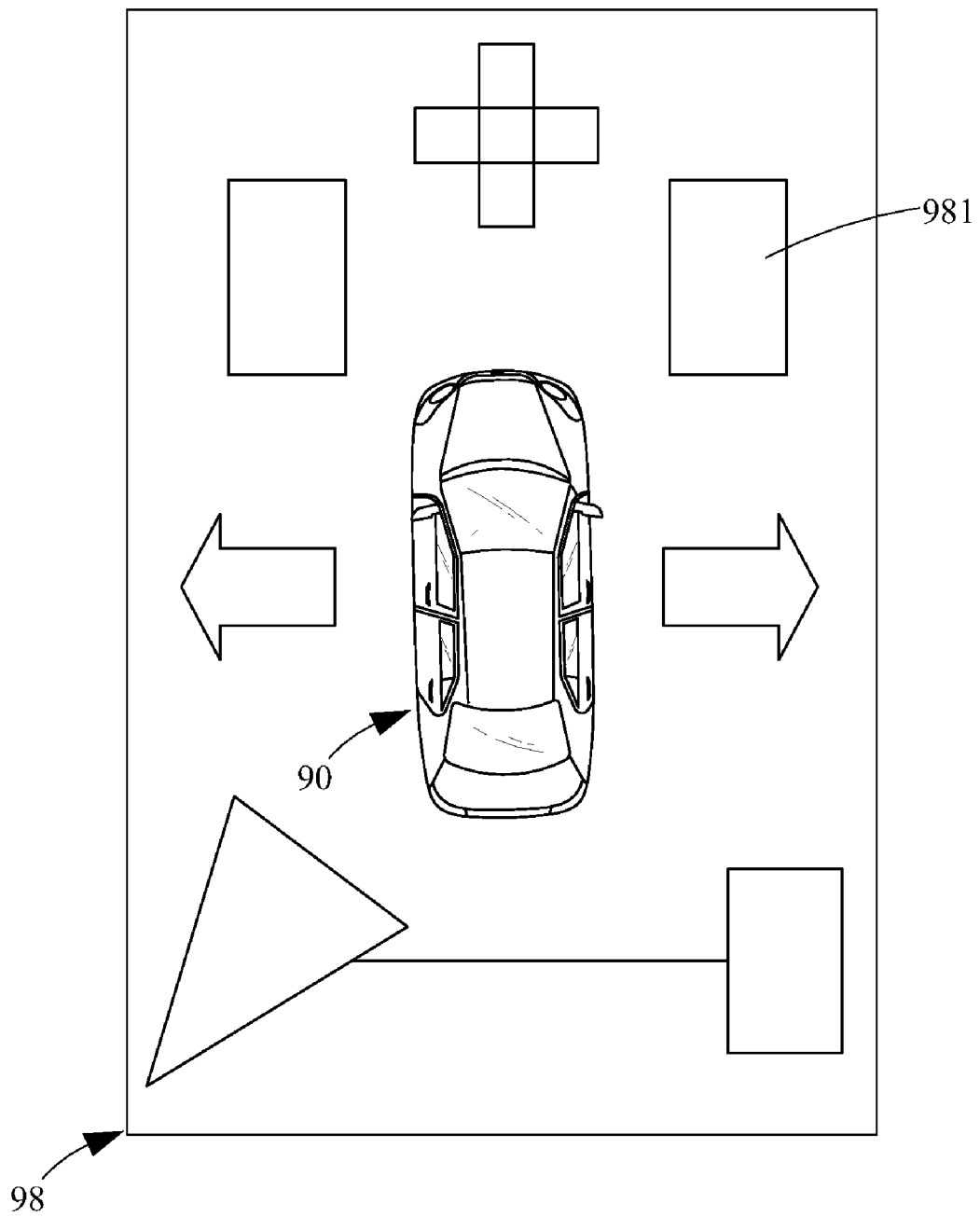
FIG. 2F is a schematic diagram showing a surrounding seamless bird-view image showing the entire view surrounding the carrier according to an embodiment of the present disclosure.

Finally, the flow of FIG. 1 proceeds to step 24. At step 24, the plural overlapped images and the portions of the plural transformed bird-view images that are not overlapped are combined into a surrounding seamless bird-view image, as the surrounding seamless bird-view image 98 shown in FIG. 2F. Since the weighting value of the corresponding points in any two adjacent bird-view images are determined according to their respective boundary distances, each corresponding pixel in the overlapping of the two adjacent images can contribute to the final overlapped image according to the determined weighting value so that there will be no cutting and jointing process required for combining the plural surrounding bird-view images as those did in prior arts, and thus a surrounding seamless bird-view image can be formed.

Figure 5A:
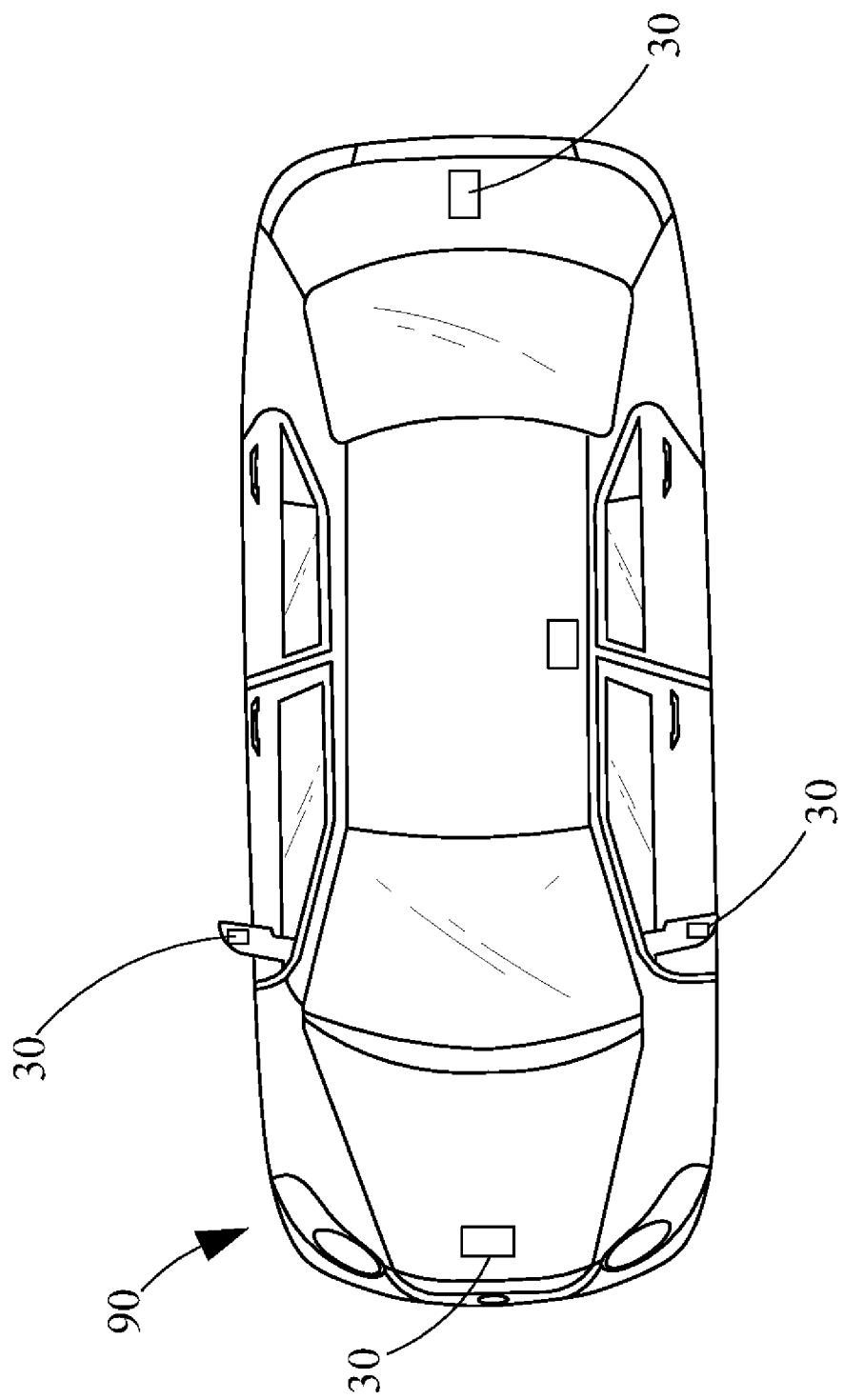
FIG. 5A and FIG. 5B are schematic diagrams showing a system for forming surrounding seamless bird-view image according to an embodiment of the present disclosure.
Figure 5B:
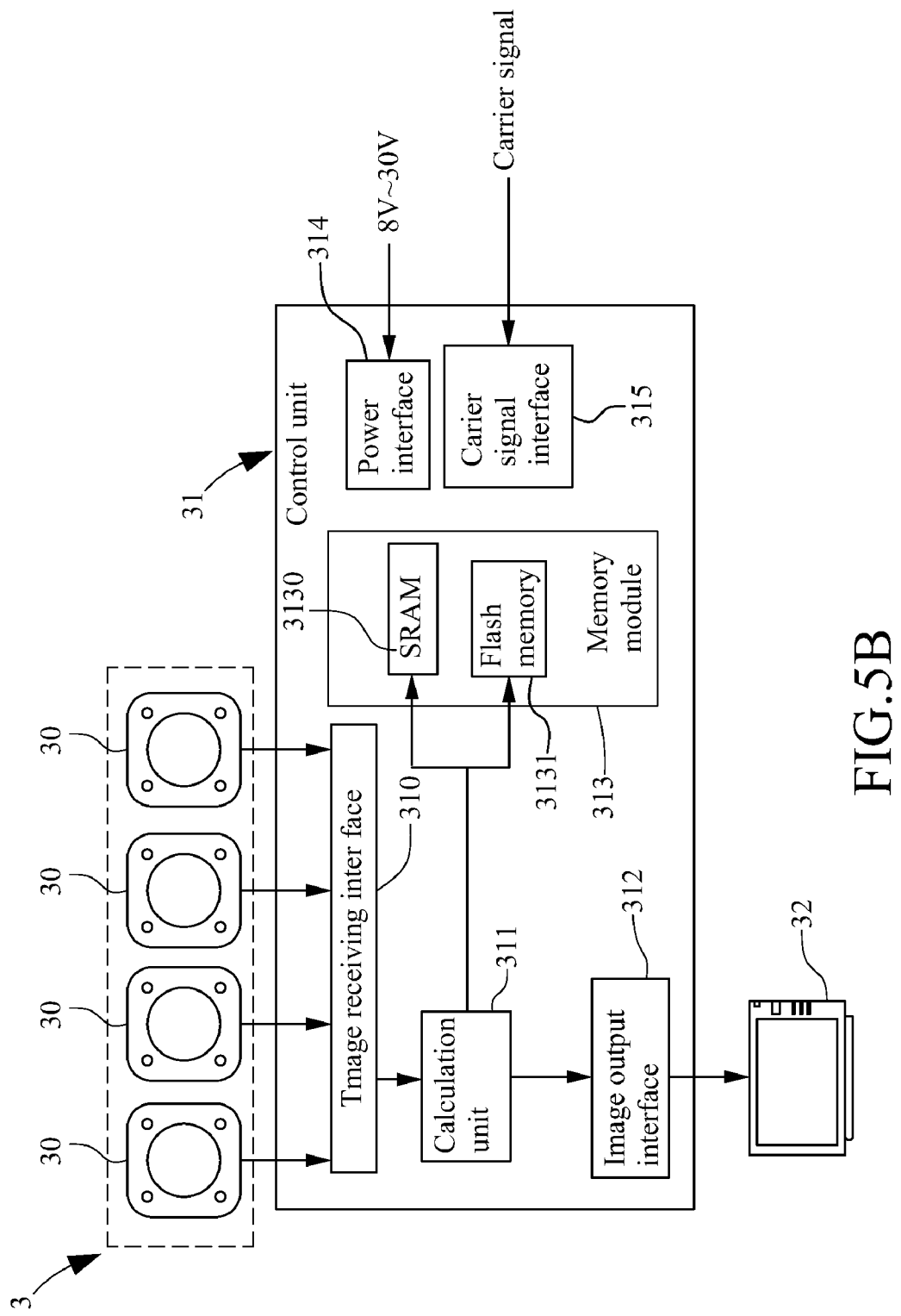

Please refer to FIG. 5A and FIG. 5B, which are schematic diagrams showing a system for forming surrounding seamless bird-view image according to an embodiment of the present disclosure. As shown in FIG. 5A and FIG. 5B, the system 3 is comprised of a plurality of imaging devices 30, a control unit 31 and a display unit 32. The plural imaging devices 30 are mounted respectively on a carrier 90 at different positions thereof, each to be used for generating a surrounding image. It is noted that the carrier 90 can be a vehicle, and the imaging devices 30, each capable of being a camera or a camcorder, are mounted on the vehicle respectively at the front side, rear side, left side and right side thereof, but are not limited thereby. Moreover, the amount of the imaging devices 30 being mounted on the carrier 90 is determined according to actual requirement and thus is not limited to the four imaging devices shown in FIG. 5A. As the plural imaging devices 30 are arranged focusing in different directions surrounding the carrier 90, they can be used for generating a plurality of surrounding images with different field-of-views.

Figure 3:
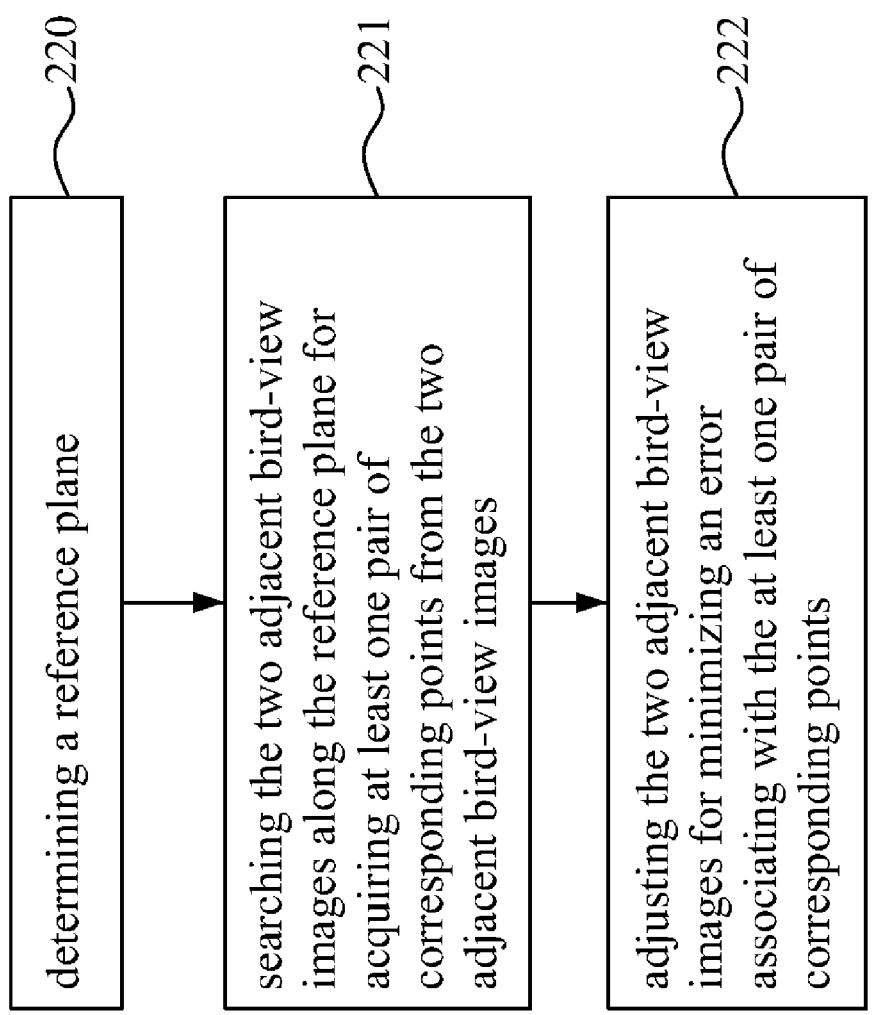
FIG. 3 is a flow chart depicting the steps for identifying overlapped regions in the present disclosure.
Figure 4:
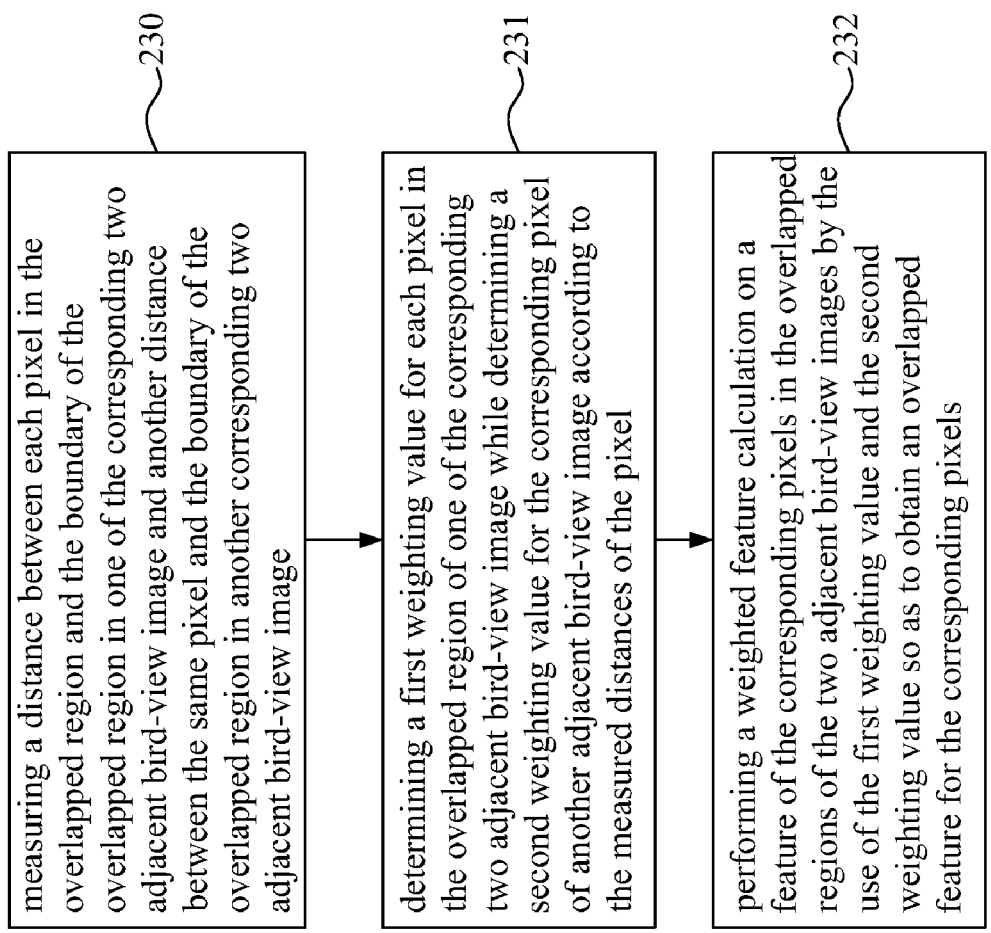
FIG. 4 is a flow chart depicting the steps of a weight calculation process according to an embodiment of the present disclosure.

The control unit 31, being coupled to the plural imaging devices 30, is used for receiving the plural surrounding images, while it is designed to perform the processes depicted in the flow charts of FIG. 1, FIG. 3 and FIG. 4, and thereby, acquire a surrounding seamless bird-view image showing the entire view surrounding the carrier 90. In this embodiment, the control unit 31 further comprises: an image receiving interface 310, a calculation unit 311, an image output interface 312 and a memory module 313. The image receiving interface 310 is coupled to the plural imaging devices 30 for receiving the plural surrounding images. The calculation unit 311 is used for performing the processes depicted in the flow charts of FIG. 1, FIG. 3 and FIG. 4, and thereby, acquire a surrounding seamless bird-view image showing the entire view surrounding the carrier 90. The memory module 313 is coupled to the calculation unit 311. In this embodiment, the memory module 313 includes a static random access memory (SRAM) 3130 and a flash memory 131. The image output interface 312 is coupled to the calculation unit 311 and a display unit 32 for transmitting the surrounding seamless bird-view image to the display unit 32. In addition, the control unit 31 further comprises: a power interface 314, for receiving power from a voltage source; and a carrier signal interface 315, for receiving signals generated from the carrier 90. Moreover, the display unit 32, being disposed inside the carrier 90 while coupling to the control unit 31, is provided for receiving and displaying the surrounding seamless bird-view image.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for forming surrounding seamless bird-view image, comprising the steps of:
   providing a plurality of surrounding images;
   performing a viewpoint transformation process upon the plural surroundings for transforming the same into a plurality of corresponding bird-view images;
   identifying an overlapped region from any two adjacent bird-view images;
   performing a weight calculation process for multiple times so as to obtain an overlapped image from the overlapped regions of any two adjacent bird-view images, as each weight calculation process further comprises the step of:
      measuring a distance between each pixel in the overlapped region and the boundary of the overlapped region in one of the corresponding two adjacent bird-view image and another distance between the same pixel and the boundary of the overlapped region in another corresponding two adjacent bird-view image;
      determining a first weighting value for each pixel in the overlapped region of one of the corresponding two adjacent bird-view image while determining a second weighting value for the corresponding pixel of another adjacent bird-view image according to the measured distances of the pixel; and
   performing a weighted feature calculation on an image feature of the corresponding pixels in the overlapped regions of the two adjacent bird-view images by the use of the first weighting value and the second weighting value so as to obtain an overlapped feature for the corresponding pixel; and
   combining the plural overlapped images and the portions of the plural transformed bird-view images that are not overlapped into a surrounding seamless bird-view image.

2. The method of claim 1, wherein the feature includes brightness and color.

3. The method of claim 1, wherein the identifying of overlapped region further comprises the steps of:
   determining a reference plane;
   searching the two adjacent bird-view images along the reference plane for acquiring at least one pair of corresponding points from the two adjacent bird-view images; and
   adjusting the two adjacent bird-view images for minimizing an error associating with the at least one pair of corresponding points.

4. The method of claim 3, wherein each of the corresponding points of the two adjacent bird-view images is a specific object in its corresponding bird-view image selected from the group consisting of: lines, patterns and texts.

5. The method of claim 3, wherein the adjusting of the two adjacent bird-view images is performed in a manner selected from the group consisting of: enabling the two adjacent bird-view images to rotate relative to each other, scaling the two adjacent bird-view images with respect to each other, shifting the two adjacent bird-view images relative to each other, and the combination thereof.

6. The method of claim 3, wherein the error is substantially the mean square of the characteristic values respectively associating to the at least one pair of the corresponding points in the two adjacent bird-view images.

7. The method of claim 6, wherein the characteristic value is a value selected from the group consisting of: a brightness value and a color value.

8. The method of claim 1, further comprising the step of:
   transmitting the surrounding seamless bird-view image to a display unit disposed inside a carrier for displaying.

9. The method of claim 1, wherein the plurality surrounding images are obtained by the use of a plurality of imaging devices as the plural imaging devices are mounted on a carrier at different positions thereof while focusing in different directions around the carrier.

10. The method of claim 1, wherein the carrier is a vehicle.

11. A system for forming surrounding seamless bird-view image, comprising: a plurality of imaging units, respectively mounted on a carrier at different positions thereof, each being used for generating a surrounding image; a control unit, further comprising: an image receiving interface, for receiving the plural surrounding images; a calculation unit, for performing a process upon the received plural surrounding images so as to form a surrounding seamless bird-view image accordingly; a memory module, coupled to the calculation unit; and an image output interface, coupled to the calculation unit and a display unit, for outputting the surrounding seamless bird-view image; and the display unit, disposed inside the carrier while coupling to the control unit, for receiving and displaying the surrounding seamless bird-view image; wherein after receiving the plural surrounding images, the control unit is enabled to perform an operation comprising the steps of: performing a viewpoint conversion process upon the plural surroundings for transforming the same into a plurality of corresponding bird-view images; identifying an overlapped region from any two adjacent bird-view images; performing a weight calculation process so as to obtain an overlapped image from the overlapped regions of any two adjacent bird-view images as the weight calculation process further comprises the steps of: measuring a distance between each pixel in the overlapped region and the boundary of the overlapped region in one of the corresponding two adjacent bird-view image and another distance between the same pixel and the boundary of the overlapped region in another corresponding two adjacent bird-view image; determining a first weighting value for each pixel in the overlapped region of one of the corresponding two adjacent bird-view image while determining a second weighting value for the corresponding pixel of another adjacent bird-view image according to the measured distances of the pixel; and performing a weighted feature calculation on an image feature of the corresponding pixels in the overlapped regions of the two adjacent bird-view images by the use of the first weighting value and the second weighting value so as to obtain an overlapped feature for the corresponding pixels; and combining the plural overlapped images and the portions of the plural transformed bird-view images that are not overlapped into a surrounding seamless bird-view image.

12. The system of claim 11, wherein the plural imaging devices are mounted on the carrier respectively at the front side, rear side, left side and right side thereof.

13. The system of claim 11, wherein the carrier is a vehicle.

14. The system of claim 11, wherein the identifying of the overlapped region performed by the control unit further comprising the steps of: determining a reference plane; searching the two adjacent bird-view images along the reference plane for acquiring at least one pair of corresponding points from the two adjacent bird-view images; and adjusting the two adjacent bird-view images for minimizing an error associating with the at least one pair of corresponding points.

15. The system of claim 14, wherein each of the corresponding points of the two adjacent bird-view images is a specific object in its corresponding bird-view image selected from the group consisting of: lines, patterns and texts.

16. The system of claim 14, wherein the adjusting of the two adjacent bird-view images is performed in a manner selected from the group consisting of: enabling the two adjacent bird-view images to rotate relative to each other, scaling the two adjacent bird-view images with respect to each other, shifting the two adjacent bird-view images relative to each other, and the combination thereof.

17. The system of claim 14, wherein the error is substantially the mean square of the characteristic values respectively associating to the at least one pair of the corresponding points in the two adjacent bird-view images.

18. The system of claim 17, wherein the characteristic value is a value selected from the group consisting of: a brightness value and a color value.

19. The system of claim 11, wherein the control unit further comprises:
    a power interface, for receiving power from a voltage source; and
    a carrier signal interface, for receiving signals generated from the carrier.

20. The system of claim 11, wherein each imaging device is a device selected from the group consisting of: a camera and a camcorder.

21. The system of claim 11, wherein the memory module further comprises: a static random access memory and a flash memory.

* * * * *